(12) United States Patent
Billing

(10) Patent No.: US 6,239,846 B1
(45) Date of Patent: May 29, 2001

(54) DIGITAL VIDEO EFFECTS, APPARATUS AND METHOD

(75) Inventor: Robert Billing, Crowthorne (GB)

(73) Assignee: Questech Limited, Wokingham (GB)

( * ) Notice: Subject to any disclaimer, the term of this patent is extended or adjusted under 35 U.S.C. 154(b) by 0 days.

(21) Appl. No.: 09/054,522

(22) Filed: Apr. 3, 1998

(30) Foreign Application Priority Data

Apr. 4, 1997 (GB) .................................................... 9706916

(51) Int. Cl.$^7$ ........................................................ H04N 9/74

(52) U.S. Cl. ............................ 348/578; 348/581; 348/583

(58) Field of Search ...................................... 348/578, 580, 348/581, 583, 619, 620; H04N 9/74, 5/21

(56) References Cited

U.S. PATENT DOCUMENTS 6,028,645 * 2/2000 Reid ....................................... 348/578

* cited by examiner

*Primary Examiner*—Sherrie Hsia
(74) *Attorney, Agent, or Firm*—Jacobson, Price, Holman & Stern, PLLC

(57) ABSTRACT

A digital video effects apparatus is arranged to generate a digital video effect by interpolating the values of parameters governing the effect, according to a given function, between time points corresponding to selected frames of a video signal and at which the parameters are fixed at selected values. The apparatus is organised in such a manner that the values of parameters are stored in exclusive timelines enabling the time points at which the parameter values are fixed to be adjusted without reference to other parameters governing the same video effect.

18 Claims, 4 Drawing Sheets

DIGITAL VIDEO EFFECTS, APPARATUS AND METHOD

BACKGROUND OF THE INVENTION

This invention concerns the processing of digital video images and relates more especially to an improved method and means for achieving digital video effects.

It is well known to effect the transformation of a digital video image in such a manner that image information from one video source can be combined with that from another in order to achieve a variety of special effects. For example a frame containing a first image can be caused to move around within the frame of a second image by defining a desired trajectory within the second image frame. By defining parameters such as position, size, rotation and border size of the moving image further effects can be achieved. As will be understood by one skilled in the art of video editing such effects require the selection and manipulation of many different image parameters as made available for control in any given digital video effects apparatus. Effects such as turning pages, trails, textures, 3-D solid shapes, chroma keys, wraps, defocus, and shatters can all be achieved, and in a typical apparatus as many as four hundred different image parameters may be available for control by the editor. To edit such parameters for each frame of a moving image would be extremely labour intensive, and therefore in known digital effects apparatus controls are provided to enable the editor to set the values of selected parameters at critical points in the running time of a scene involving a given effect. Between the critical points at which the parameters are fixed, the values of the parameters are interpolated by the digital video effects apparatus in order to produce the desired course of the relevant effect. Such interpolation need not necessarily by linear but may proceed according to a function that has itself been defined by selection of an appropriate parameter.

This process is known as keyframe editing and virtually all currently used digital video effects apparatus are based on this system. The system does however have disadvantages in that unless the editing of a desired effect is very carefully planned in advance difficulty may arise when a sequence of events defined by consecutive keyframes is to be modified. This is because when a keyframe has been defined during the editing process the values of the parameters defined thereby have been fixed in the manner of a snapshot and thus the keyframe defines a limit of particular stage of interpolation for all parameters set thereby. If it should be desired to change the value of one parameter of a keyframe in order to vary a selected effect, for example, it my not therefore be possible to avoid undesirable changes in the course of interpolation of this parameter because the values of this parameter have been fixed by adjacent keyframes that may have been inserted only with the intention of governing the interpolation of other parameters. For this reason the editing of an existing stored effect may require laborious revision of many adjacent keyframes in order to achieve a desired charge.

SUMMARY OF THE INVENTION

There is therefore a requirement for a digital video effects apparatus that allows editing of effects to be achieved in a simpler, more versatile and intuitive manner than has hitherto been possible and it is an object of the invention to provide an answer to this problem.

In accordance with one aspect of the invention there is provided a method for processing a digital video image to provide a desired video effect, which comprises selecting values of parameters that are to govern the course of said effect during the time period of the corresponding scene to be displayed, storing the said values of said parameters with reference to time, at defined points in said time period spaced from one another in such a manner that the desired course of each said parameter can be interpolated from the stored values for the reproduction of video image frames occurring between the defined point of said time period, and causing said stored values to be retrieved and interpolated by a digital video effects apparatus during reproduction of a digital video signal in order to display the desired effect, characterised in that the values of each of at least some of said parameters are stored independently of other parameters in a timeline exclusive to that parameter, whereby the position of the defined point at which said value is stored in the timeline, and/or the value of the parameter stored at said point can be adjusted independently of the other parameters.

The invention further provides a digital video effects apparatus for use in said method. Such an apparatus may provide conventional video effects but is organised in such a manner as to enable independent selection and storage of values of parameters governing the effects to be achieved in order to obtain the advantages of the method defined above. The apparatus is further organised to enable retrieval and interpolation of the stored values in such a manner that the signals ultimately derived for reproduction of the effect are comparable with those provided in the conventional apparatus operating on the keyframe basis and therefore the hardware required for reproduction of the effect will not be described further.

It will be appreciated that given defined requirements for the provision of manual controls for selection and storage of data, for a corresponding display for organising the data to be stored and for the manner in which data is to be stored and retrieved, it will be within the routine skills of one versed in the art to provide corresponding software to enable the required functions to be achieved. Thus the invention lies not in any resultant software programme that may be so derived and that will not therefore be further described in detail, but in the functional interrelationship of features provided by the machine embodying such software.

A preferred embodiment of the invention will therefore be described in these terms below.

DETAILED DESCRIPTION OF THE PREFERRED EMBODIMENT

Figure 1A:
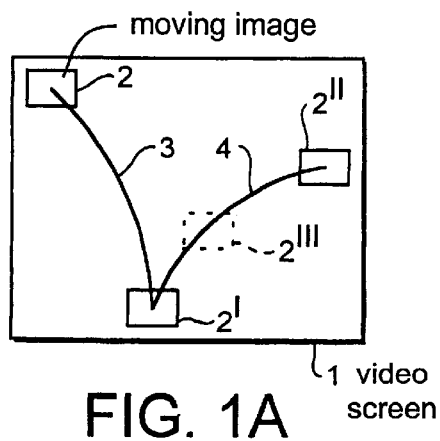
FIG. 1 is a diagram illustrating the concept of a digital video effect produced using a known keyframe-based apparatus and an attendant disadvantage thereof.

Referring to FIG. 1, there is shown in FIG. 1A a diagrammatic depiction of a video screen represent by the rectangle 1, within which is to be depicted the moving image of a picture derived from another source and enclosed within a rectangle 2 to be moved within the image are of the rectangle 1. Assuming that the rectangle 2 is to be given a trajectory simulating a bounce, as indicated by the lines 3 and 4, in the known keyframe editing process there will be inserted at the relevant point in time a keyframe defining parameters including the X and Y positions of the rectangle 2 as shown in the top left hand corner of the frame 1, a keyframe defining the X and Y positions of the frame 2 at the lower edge of the frame 1, as indicated at 2', and a further keyframe including the X and Y parameters of the frame 2 when at the right hand edge of the frame 1, as indicated by 2". The parameters for intermediate positions of the frame 2 during movement between the three positions defined by the respective keyframes will be interpolated from the values defined by the keyframes according to appropriate functions that may also be stored as parameters of the relevant keyframe. Such a process is well known to one skilled in the art.

Figure 1B:
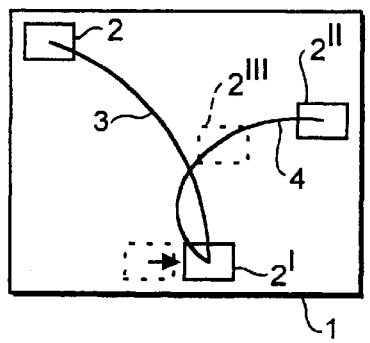

Assume now that it is desired that during movement of the frame 2 from the position 2' to the position to 2",the frame 2 is to be provided with a border. To achieve this effect a further keyframe is inserted at the point where the border is to be formed, as indicted by the broken lines 2'", in order to introduce into the keyframe the parameter appropriate to the formation of a border. Since, however, each keyframe fixes all of the relevant parameters of the effect, the provision of the fourth keyframe will have the effect not only of introducing a boundary at point 2'", but also of fixing the other parameters, including the X and Y positions of the border 2 at this point. Assume now that it is desired to vary the trajectory of the bounce shown in FIG. 1A by altering the X parameter of the position 2' of the rectangle 2 to move this to the right. As shown in FIG. 1B, because of the presence of the additional keyframe at point 2'", the resultant effect will not be that the bounce will proceed smoothly from the new position 2' to the position 2", because the X and Y parameters of the frame 2 have been fixed at point 2'", and therefore the interpolation of the trajectory indicated by line 4 must proceed through this point as illustrated in FIG. 1B. This characteristic is inherent in keyframe-based digital video effects apparatus and represents a significant disadvantage.

Figure 2:
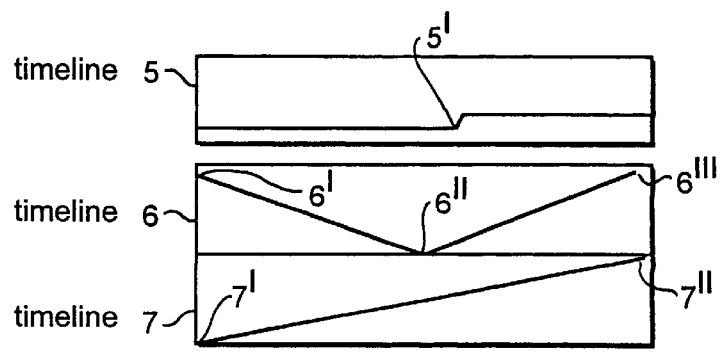
FIG. 2 is a diagram illustrating the concept embodied in a method and apparatus in accordance with the present invention.

Referring now to FIG. 2, there is shown the concept of the storage of effects parameters in accordance with the invention. In FIG. 2 the boxes 5, 6 and 7 represent what will hereinafter be referred to as 'timelines', and a separate timeline is provided for each relevant parameter of the effect. Thus, the timeline indicated by the box 5 represents the border parameter introduced at position 2'" of FIG. 1, the timeline represented by box 6 represents the Y parameter defining the position of the rectangle 2 and the box 7 represents the timeline defining the X parameter covering the position of the rectangle 2 in FIG. 1.

In each timeline the horizontal axis represents the time period of the effect to be achieved and the vertical axis represents the value of the parameter stored therein. It will be appreciated that the parameter values are stored only at points of transition of the graphic lines, the lines themselves representing the fact that the values are interpolated between the points of transition. thus, for the timeline 5, the value of the border parameter is stored only a position 5', for the timeline 6 the value of the Y parameter is stored only at the points 6', 6" and 6'" and for the timeline 7 the values of the X parameter are stored only at the beginning and end of the timeline at the points 7' and 7". Therefore, because of the manner in which the parameter values are stored in the independent timelines, a transition of a parameter can occur in its own timeline without fixing the parameters of related timeline.

Figure 3A:
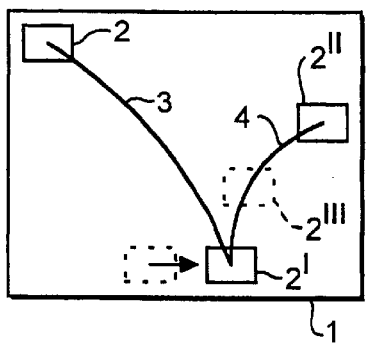
FIG. 3 is a diagram illustrating the production of a digital view effect by means of the invention.
Figure 3B:
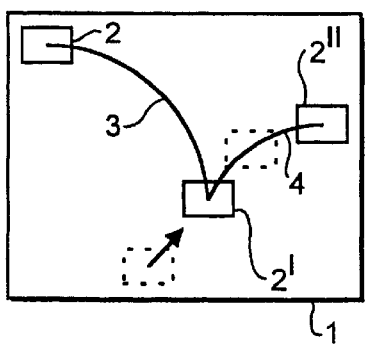

The effect of this is illustrated in FIGS. 3A and 3B, wherein FIG. 3A corresponds to the situation in FIG. 1B and illustrates that because the introduction of the border at position 2'" is governed only by the value in timeline 5 of FIG. 2, smooth interpolation of the X and Y positions of the frame 2 can be effected between the positions 2' and 2". Likewise, if the value of the Y parameter is changed to move the position of the rectangle 2 away from the lower edge of the image frame 1, as illustrated in FIG. 3B, new trajectories 3 and 4 can be interpolated from the stored values without requiring further adjustment of the associated timelines.

Figure 4:
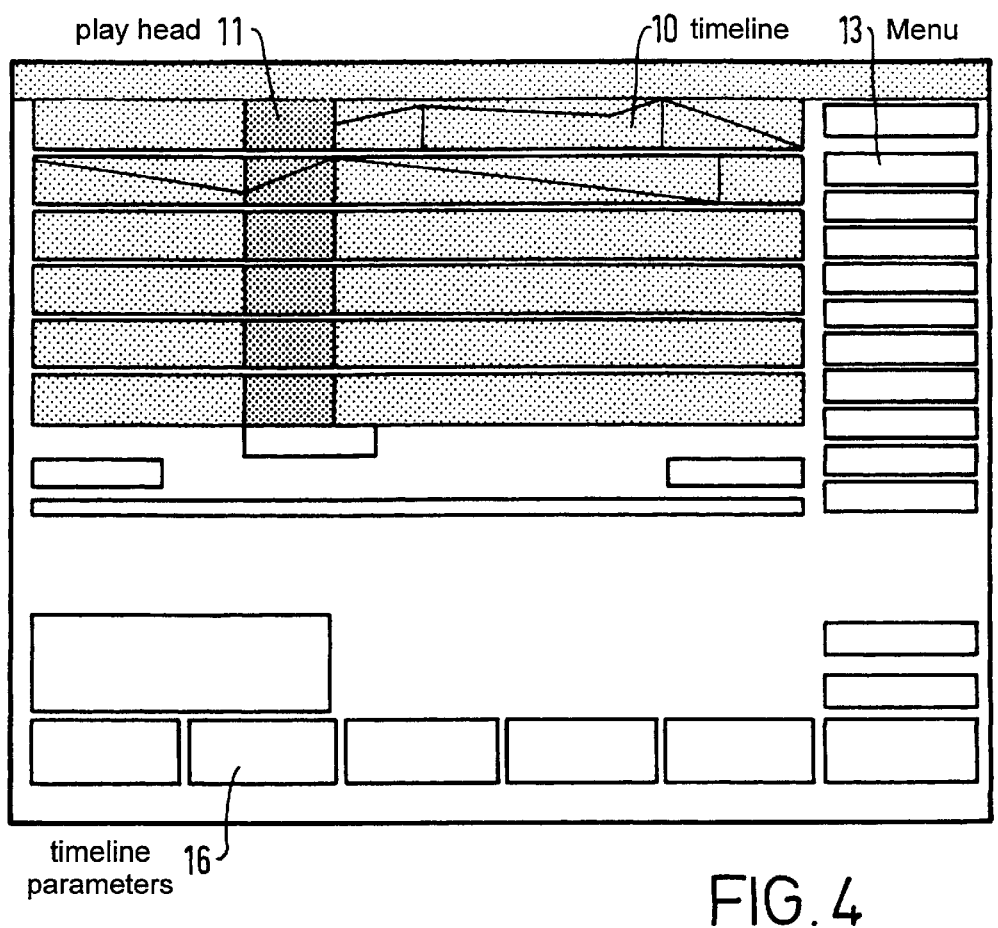
FIG. 4 is a diagram illustrating a graphic display provided by an apparatus in accordance with the invention and enabling the selecting and entry of data.
Figure 5:
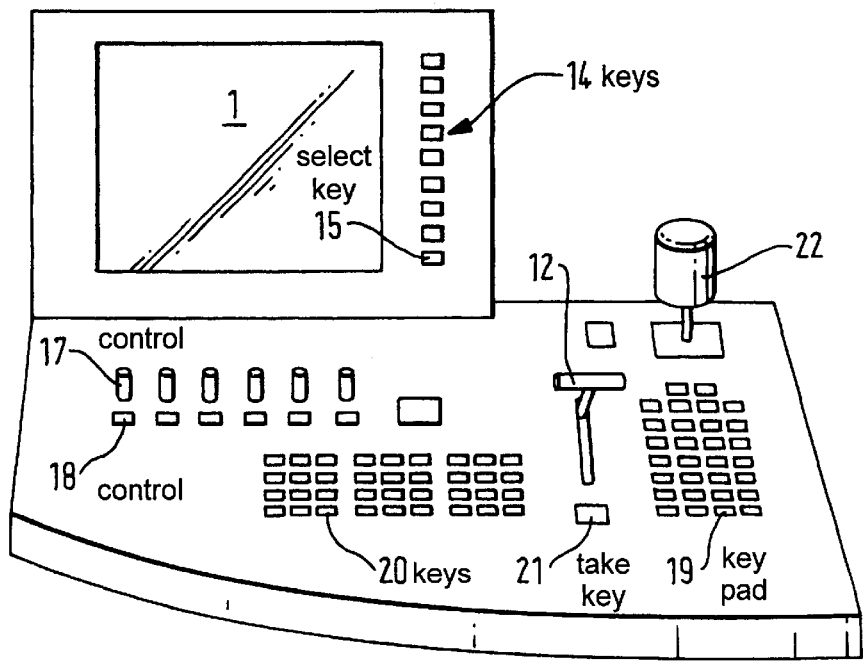
FIG. 5 is a corresponding view of an apparatus embodying the graphic display and showing an appropriate manual control panel for use therewith.

FIGS. 4 and 5 illustrate respectively a graphic display and associated manual controls that enable storage of data in accordance with the novel concept referred to above.

In FIG. 4, the graphic image shown will be represented on the screen of the video monitor 1 of the apparatus of FIG. 5, when the apparatus is set in an appropriate control mode. The horizontal bands 10 indicated in the upper region of the screen of FIG. 4 represent timelines equivalent to those of FIG. 2, whereas the vertical shaded are 11 common to the timelines represents a play head that can be moved horizontally along the timelines for positioning events within the timelines, making selections for editing and indicating progress of sequence runs. The head 11 can be positioned horizontally by entering numerical data, or can be positioned manually using a T-bar control 12 as illustrated in FIG. 5.

The horizontal panels 13 in the right hand area of the screen represent vector menus that provide access to corresponding ranges of effects parameters to be allocated to the timelines 10 for editing. These menus may be selected by menu selection keys 14 indicated on the right hand side of the screen 1 in FIG. 5, and the groups of menus indicated at 13 can be toggled to select further groups of menus by means of a select key 15 also indicated in FIG. 5.

the rectangular areas 16 at the lower edge of the display of FIG. 4 are allocated to parameters of the respective timelines 10 and are also assigned to correspondingly positioned manually adjustable controls 17 and control keys 18 enabling the setting of the values of the respective parameters at the point designated by the play head 11. The areas 16 also indicate the parameter values at this position.

Thus, the entry of parameter values in given timelines to achieve any desired effect can be achieved in a simple and versatile manner by toggling the menus 13 to find the required effect, selecting the appropriate menu and associated timelines via keys 14 and entry of the relevant values using T-bar 12 and controls 17 and 18, or by entry of numeric valves using a key pad 19 as shown in FIG. 5. The keys 20 in FIG. 5 are provided to enable a variety of timeline editing functions such as cutting, copying and pasting, and further keys are provided for multi-channel control in known manner and for positioning, locating and selecting events on the timelines. A take key 21 shown in FIG. 5 is further provided for running the sequence of selected effect.

It will be appreciated that in addition to the graphic display illustrated in FIG. 4, the screen 1 of the apparatus of FIG. 5 can show a representation of the effect itself, and live manipulation of picture size, position and rotation of an image area to be represented by the effect can be achieved using a joystick 22.

An example of an editing effect that can be achieved by the apparatus of FIGS. 4 and 5 will now be described in further detail with reference to FIGS. 6–9, which illustrate the editing of a bounce effect.

Figure 6A:
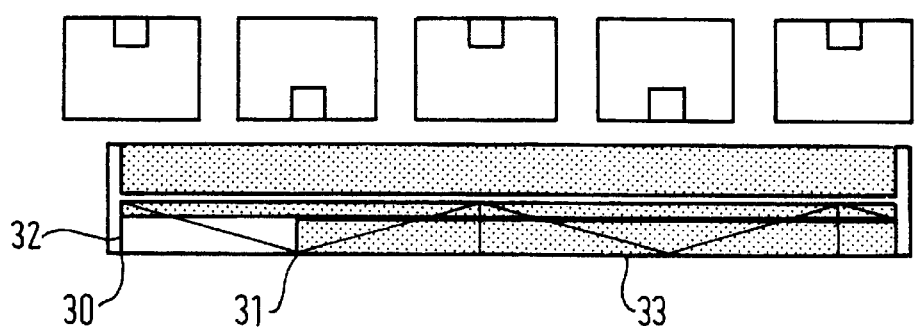
FIGS. 6A and 6B are diagrams illustrating examples of the entry of data utilising the apparatus of FIGS. 4 and 5.

In FIG. 6A the lower shaded area represents two timelines of a graphic display as shown in FIG. 4, in the lower of which is entered the values of the Y parameter of an image area which is to be shown as bouncing. In the upper part of FIG. 6A are shown representations of the display monitor indicating corresponding Y positions of the image area at the respective positions of events determined by the entry of data in the Y timeline. Thus, starting from the left hand end of the Y timeline, an initial Y value is set at the point 30 using the joy stick 22, a control knob 17, or the numeric key pad and the respective data entry key 18. The play head of the graphic display is now moved forward to position 31 using the T-bar 22 or numeric key pad 19, and the next value for the parameter Y is entered. Further values of the Y parameter can be entered in a similar manner, or, the area between positions 30 and 31 can be selected as indicated at 32, copied and pasted at a further position 33 of the timeline. This process can be repeated to define as many up/down moves as desired.

Referring to 6B, values for the X parameter can similarly be entered in the upper one of the two timelines as indicated, the areas above the beginning and end of the upper timelines showing the corresponding X and Y positions of the image area to be moved, in as similar manner to FIG. 6A.

Figure 6B:
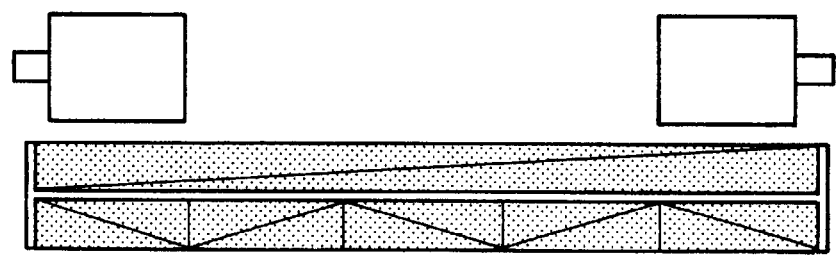
Figure 7:
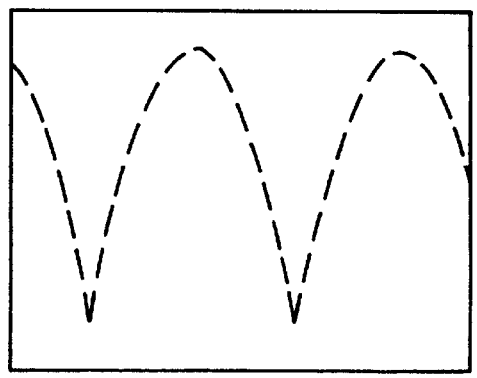
FIG. 7 is an illustration of a graphic display showing the trajectory path of an effect in accordance with FIGS. 6A and 6B.

FIG. 7 shows a graphic representation of the trajectory on a video screen of the effect defined by the timelines as shown in FIG. 6B. It will be appreciated that the sinusoidal curve of FIG. 7 results form the fact that interpolation of the values of the Y parameter is not linear but proceeds according to a function defined by a further selected parameter. The straight lines between the values of the Y timeline merely indicate that interpolation will occur and do not represent the actual values of the Y parameter that will be interpolated. Of course, the Y parameter could be arranged to be interpolated linearly, in which case the trajectory of FIG. 7 would alter to a simple triangular form.

Figure 8:
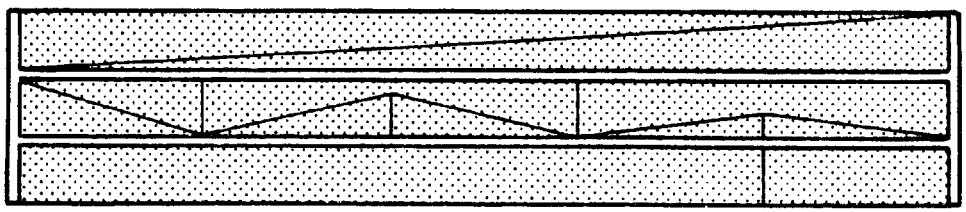
FIG. 8 is a view similar to FIG. 6B showing an adjustment of the parameters governing the trajectory shown in FIG. 7.
Figure 9:
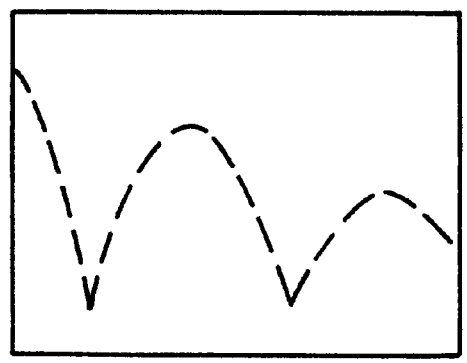
FIG. 9 is a graphic display illustrating the corresponding modifications of the trajectory.

It will be appreciated from the above description that versatile editing of the parameters contained in individual timelines can be achieved. For example, as shown in FIG. 8, by stepping through the consecutive parameter values in the Y timeline, for example by using previous and next keys of the key board to step the play head through the timeline events, the values of the Y parameter can be adjusted. In this case a gradually decreasing bounce is defined as shown in FIG. 9, the trajectory being defined by the adjusted parameter values shown in the Y timeline of FIG. 8.

Further adjustments of the timelines may be achieved by means of other editing functions that can be made available via the key board of the device of FIG. 5. For example, the timelines can be compressed or extended in the horizontal direction to vary the timing of the events represent therein. By compressing the timelines of FIG. 8, the bounce depicted in FIG. 9 could be made to end within the image area of the video frame instead of extending over the right hand margin as illustrated in FIG. 9.

It will thus be appreciated that the method and apparatus in accordance with the invention enables versatile editing of digital video effects in a novel and advantageous manner not hitherto available in known arrangements.

What is claimed is:

1. A method for processing a digital video image to provide a desired video effect, which comprises: a) selecting values of parameters that are to govern the course of said effect during the time period of a corresponding scene to be displayed, b) storing said values of said parameters with reference to time, at defined points in said time period spaced from on another in such a manner that the desired course of each said parameter can be interpolated from the stored values for the reproduction of video image frames occurring between the defined points of said time period, and c) causing said stored values to be retrieved and interpolated by a digital video effects apparatus during reproduction of a digital video signal in order to reproduce the desired effect, whereby step (b) comprises storing values of each of at least some of said parameters independently of other parameters in a time line exclusive to that parameter, whereby the position of the defined point at which any value is stored in the time line, and/or the value of a stored parameter at said point can be adjusted independently of the other parameters.

2. A method according to claim 1, including the further steps of defining said timeline in graphical form on a visual display, providing means enabling manual selection of the value of said parameter at a defined point in said timeline and displaying graphically with reference to the displayed timeline a course of interpolation of said value and said defined point.

3. A method according to claim 2 wherein said further steps are carried out for each of a plurality of said timelines displayed simultaneously on said visual display and relating to a group of related parameters.

4. A method according to claim 3 including the further step of defining in graphical form on said display a playhead spanning said plurality of timelines, providing means allowing the position of said playhead to be moved relatively to common time axis of said timelines and providing display means for indicating for each of said parameters the value thereof at the instant in time represented by said playhead.

5. A method according to claim 4 wherein the display means for each of said parameter values is located physically adjacent to a manually operable means for adjusting the value.

6. A method as claimed in claim 5, wherein the display means for each of said parameter values comprises a designated area of the screen of a video monitor.

7. A method as claimed in claim 2 wherein said visual display is the screen of a video monitor.

8. A method as claimed in claim 3, further including the steps of organising parameters of which said values are to be selected into a plurality of groups, and providing means enabling selection of any one of said groups for simultaneous display of the parameters thereof on said timelines of the graphical display.

9. A method as claimed in claim 8, including the steps of providing for each group a corresponding selecting means associated with a display means for identifying the group to be selected.

10. A method as claimed in claim 9 wherein said visual display is the screen of a video monitor and each said display means comprises an area of a screen of the video monitor.

11. A method as claimed in claim 9 including the further step of organising separate pluralities of said groups into libraries of groups and providing means for allocating groups of a selected one of said libraries to said selecting means and said display means.

12. A digital video effects apparatus for processing a digital video image to provide a desired video effect, comprising means for displaying a scale representing the course of a digital video effect that is to be reproduced within a digital video signal, means for displaying with reference to said scale instants in time at which values of parameters governing said effect are defined, means for displaying with reference to each said instant in time the defined value of the corresponding parameter or parameters, manually operable means for adjusting with reference to said scale each instant in time at which the value of a given parameter is defined, manually operable means for adjusting the value of a parameter at a defined instant, means for storing the adjusted values of said parameters and the corresponding instants in time with reference to a timeline representing said course, and means for retrieving and interpolating the values of said parameters during reproduction of a digital video signal in order to reproduce the desired effect.

13. An apparatus as claimed in claim 12, in which said means for displaying said instants in time and said values comprises a video monitor, said apparatus being arranged to display the value of each said parameter at each said instant as a graphic display with an axis representing time and an axis representing said value.

14. An apparatus as claimed in claim 13, in which, in use, said graphic display is presented on said monitor as an individual timeline for each said parameter, each individual timelines being disposed in an array of timelines spanned by a cursor representing a playhead that can be indexed with reference to a time axis of the array by said manually operable means for adjusting said instants in time, and the arrangement further being such that said manually operable means for adjusting said values of said parameters can vary the cursor.

15. An apparatus as claimed in claim 13 in which an array of said manually operable means for adjusting the values of said parameters is disposed adjacent a boundary of a screen of said video monitor, and wherein in use selected values of said parameters are displayed on said monitor, each in an area of said screen adjacent a corresponding manually operable means.

16. An apparatus as claimed in claim 13, in which means is provided to enable the selection of a particular video effect to be edited, from a group of available effects, whereby upon selection of a given effect manually operable means are allocated to a corresponding group of parameters of which the values are displayed on said video monitor.

17. An apparatus as claimed in claim 16, in which an array of keys each for selecting a corresponding video effect is disposed along the boundary of the screen of said video monitor and which is such that, in use, areas of said screen adjacent the respective keys provide indictions identifying the effects that can be selected thereby.

18. An apparatus as claimed in claim 17, arranged to provide a library comprising a plurality of said groups of video effects and comprising means for selecting said group from said library to be allocated to said array of keys.

* * * * *